US012424161B2

(12) United States Patent
Yu

(10) Patent No.: US 12,424,161 B2
(45) Date of Patent: Sep. 23, 2025

(54) DRIVING CIRCUIT, DRIVING METHOD AND DISPLAY DEVICE

(71) Applicants: Chengdu BOE Optoelectronics Technology Co., Ltd., Sichuan (CN); BOE Technology Group Co., Ltd., Beijing (CN)

(72) Inventor: Ziyang Yu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/912,629

(22) PCT Filed: Nov. 9, 2021

(86) PCT No.: PCT/CN2021/129599

§ 371 (c)(1),
(2) Date: Sep. 19, 2022

(87) PCT Pub. No.: WO2022/193685

PCT Pub. Date: Sep. 22, 2022

(65) Prior Publication Data

US 2024/0203339 A1 Jun. 20, 2024

(30) Foreign Application Priority Data

Mar. 15, 2021 (CN) ......................... 202110275825.4

(51) Int. Cl.
*G09G 3/3225* (2016.01)

(52) U.S. Cl.
CPC ... *G09G 3/3225* (2013.01); *G09G 2300/0842* (2013.01); *G09G 2310/0243* (2013.01); *G09G 2310/0264* (2013.01); *G09G 2310/08* (2013.01)

(58) Field of Classification Search
CPC ....... G09G 2310/0286; G09G 2310/08; G09G 2310/0267; G09G 2310/061; G09G 2310/0289; G09G 2310/0251; G09G 2310/027; G09G 2310/0291; G09G 2310/0283; G09G 2310/06; G09G 2310/0297; G09G 3/3677; G09G 3/20;
(Continued)

(56) References Cited

U.S. PATENT DOCUMENTS

2016/0247442 A1 8/2016 Dai et al.
2016/0293090 A1 10/2016 Long et al.
(Continued)

FOREIGN PATENT DOCUMENTS

CN 104318888 A 1/2015
CN 104637462 A 5/2015
(Continued)

OTHER PUBLICATIONS

CN 202110275825.4 first office action, Nov. 25, 2021.
PCT/CN2021/129599 international search report and written opinion, Jan. 28, 2022.

*Primary Examiner* — Dong Hui Liang
(74) *Attorney, Agent, or Firm* — IPro, PLLC

(57) ABSTRACT

The present disclosure provides a driving circuit, a driving method and a display device. The driving circuit includes a first control circuit, a second control circuit, an energy storage circuit, a first output circuit and a second output circuit. The first control circuit is configured to control a potential at a first node in accordance with an input driving signal from an input driving signal end. The second control circuit is configured to control the first node to be electrically coupled to a first voltage end under the control of a control clock signal. The first output circuit is configured to control an output driving signal end to be electrically coupled to a first clock signal end under the control of the potential at the first node. The second output circuit is configured to control the output driving signal end to provide an output driving signal in accordance with the first clock signal end.

20 Claims, 11 Drawing Sheets

(58) Field of Classification Search
CPC .... G09G 3/3266; G09G 3/3233; G09G 3/36; G09G 3/3674; G09G 3/32; G09G 3/3648; G09G 3/3688; G09G 3/2092; G09G 3/3225; G09G 3/3208; G09G 3/3696; G09G 3/3275; G09G 3/3291; G09G 3/3614; G09G 2300/0426; G09G 2300/0408; G09G 2300/0842; G09G 2300/0819; G09G 2300/0861; G09G 2300/0809; G09G 2300/0852; G09G 2330/021; G09G 2320/0233; G09G 2320/043; G09G 2320/042; G09G 2320/0223; G09G 2230/00
See application file for complete search history.

(56) References Cited

U.S. PATENT DOCUMENTS

| | | | | |
|---|---|---|---|---|
| 2016/0372034 | A1 | 12/2016 | Zhou | |
| 2017/0032750 | A1 | 2/2017 | Shao et al. | |
| 2017/0193916 | A1 | 7/2017 | Ma | |
| 2018/0348922 | A1 | 12/2018 | Luo et al. | |
| 2019/0035322 | A1 | 1/2019 | Kim et al. | |
| 2020/0143731 | A1 | 5/2020 | Zheng | |
| 2020/0202967 | A1 | 6/2020 | Hu et al. | |
| 2021/0319742 | A1* | 10/2021 | Feng | G09G 3/3677 |
| 2021/0335203 | A1* | 10/2021 | Feng | G09G 3/2092 |
| 2022/0101782 | A1* | 3/2022 | Yang | G09G 3/32 |
| 2022/0310021 | A1* | 9/2022 | Feng | G09G 3/3266 |

FOREIGN PATENT DOCUMENTS

| | | | |
|---|---|---|---|
| CN | 105427790 | A | 3/2016 |
| CN | 106328042 | A | 1/2017 |
| CN | 109377948 | A | 2/2019 |
| CN | 110070822 | A | 7/2019 |
| CN | 111933083 | A | 11/2020 |
| CN | 112071273 | A | 12/2020 |
| CN | 113053317 | A | 6/2021 |
| WO | 2019015630 | A1 | 1/2019 |

* cited by examiner

DRIVING CIRCUIT, DRIVING METHOD AND DISPLAY DEVICE

CROSS-REFERENCE TO RELATED APPLICATION

This application is the U.S. national phase of PCT Application No. PCT/CN2021/129599 filed on Nov. 9, 2021, which claims a priority of the Chinese patent application No. 202110275825. 4 filed on Mar. 15, 2021, which is incorporated herein by reference in its entirety.

TECHNICAL FIELD

The present disclosure relates to the field of display technology, in particular to a driving circuit, a driving method and a display device.

BACKGROUND

In the related art, a Low Temperature Polycrystalline Oxide (LTPO) pixel circuit may include Low Temperature Polycrystalline Silicon (LTPS) P-type Thin Film Transistors (TFTs) and Indium Gallium Zinc Oxide (IGZO) N-type TFTs. The P-type TFT needs to be controlled through a driving signal which is active at a low level, and the N-type TFT needs to be controlled through a driving signal which is active at a high level. In addition, a light-emission control signal needs to be provided. In other words, three signal generation circuits need to be provided. At this time, a large quantity of transistors are adopted, and thereby a large space in a bezel needs to be occupied.

SUMMARY

In one aspect, the present disclosure provides in some embodiments a driving circuit, including a first control circuit, a second control circuit, an energy storage circuit, a first output circuit and a second output circuit. A first end of the energy storage circuit is electrically coupled to a first node, a second end of the energy storage circuit is electrically coupled to an output driving signal end, and the energy storage circuit is configured to store electric energy. The first control circuit is electrically coupled to an input driving signal end and the first node, and configured to control a potential at the first node in accordance with an input driving signal from the input driving signal end. The second control circuit is electrically coupled to a control clock signal end, a first voltage end and the first node, and configured to control the first node to be electrically coupled to the first voltage end under the control of a control clock signal from the control clock signal end. The first output circuit is electrically coupled to the first node, a first clock signal end and the output driving signal end, and configured to control the output driving signal end to be electrically coupled to the first clock signal end under the control of the potential at the first node. The second output circuit is electrically coupled to the first clock signal end and the output driving signal end, and configured to control the output driving signal end to provide an output driving signal in accordance with a first clock signal from the first clock signal end.

In a possible embodiment of the present disclosure, the first control circuit is further electrically coupled to a second clock signal end, and specifically configured to control the input driving signal end to be electrically coupled to the first node under the control of a second clock signal from the second clock signal end.

In a possible embodiment of the present disclosure, the second output circuit is further electrically coupled to a second voltage end, and configured to control the output driving signal end to be electrically coupled to the second voltage end under the control of the first clock signal.

In a possible embodiment of the present disclosure, the driving circuit further includes a third output circuit electrically coupled to the input driving signal end, the first voltage end and the output driving signal end, and configured to control the output driving signal end to be electrically coupled to the first voltage end under the control of the input driving signal.

In a possible embodiment of the present disclosure, the first control circuit includes a first transistor, a control electrode and a first electrode of which are electrically coupled to the input driving signal end, and a second electrode of which is electrically coupled to the first node.

In a possible embodiment of the present disclosure, the first control circuit includes a first transistor, a control electrode of which is electrically coupled to the second clock signal end, a first electrode of which is electrically coupled to the input driving signal end, and a second electrode of which is electrically coupled to the first node.

In a possible embodiment of the present disclosure, the second control circuit includes a second transistor, a control electrode of which is electrically coupled to the control clock signal end, a first electrode of which is electrically coupled to the first voltage end, and a second electrode of which is electrically coupled to the first node.

In a possible embodiment of the present disclosure, the energy storage circuit includes a storage capacitor, the first output circuit includes a first output transistor, a first end of the storage capacitor is electrically coupled to the first node, a second end of the storage capacitor is electrically coupled to the output driving signal end, a control electrode of the first output transistor is electrically coupled to the first node, a first electrode of the first output transistor is electrically coupled to the output driving signal end, and a second electrode of the first output transistor is electrically coupled to the first clock signal end.

In a possible embodiment of the present disclosure, the second output circuit includes a second output transistor, a control electrode and a first electrode of which are electrically coupled to the first clock signal end, and a second electrode of which is electrically coupled to the output driving signal end.

In a possible embodiment of the present disclosure, the second output circuit includes a second output transistor, a control electrode of which is electrically coupled to the first clock signal end, a first electrode of which is electrically coupled to the second voltage end, and a second electrode of which is electrically coupled to the output driving signal end.

In a possible embodiment of the present disclosure, the third output circuit includes a third output transistor, a control electrode of which is electrically coupled to the input driving signal end, a first electrode of which is electrically coupled to the first voltage end, and a second electrode of which is electrically coupled to the output driving signal end.

In another aspect, the present disclosure provides in some embodiments a driving method for the above-mentioned driving circuit, a driving cycle including a first stage, a second stage and a third stage arranged sequentially, the driving method including: at a first stage, controlling, by the first control circuit, a potential at the first node in accordance with the input driving signal from the input driving signal end, and controlling, by the first output circuit, the output driving signal end to be electrically coupled to the first clock signal end under the control of the potential at the first node; at a second stage, changing, by the energy storage circuit, the potential at the first node, and controlling, by the first output circuit, the output driving signal end to be electrically coupled to the first clock signal end continuously under the control of the potential at the first node; and at a third stage, controlling, by the second control circuit, the first node to be electrically coupled to the first voltage end under the control of the control clock signal, and controlling, by the first output circuit, the output driving signal end to be electrically decoupled from the first clock signal end under the potential at the first node.

In a possible embodiment of the present disclosure, the driving cycle further includes a fourth stage after the third stage, and the driving method further includes, within at least a part of time periods at the fourth stage, controlling, by the second output circuit, the output driving signal from the output driving signal end to be an inactive voltage signal in accordance with the first clock signal.

In a possible embodiment of the present disclosure, the driving circuit further includes a third output circuit, and the driving method further includes, at the first stage, controlling, by the third output circuit, the output driving signal end to be electrically coupled to the first voltage end under the control of the input driving signal.

In a possible embodiment of the present disclosure, Δt1 is greater than a sum of a fall time t1 of the first clock signal, a fall time t01 of the control clock signal and a first time interval m1, and Δt1 is smaller than w1−t2−t02−m2, where Δt1 is a time difference between a falling edge of the first clock signal and a falling edge of the control clock signal, w1 is a time for which a potential of the first clock signal is maintained as a low voltage, t2 is a rise time of the first clock signal, t02 is a rise time of the control clock signal, and m2 is a second time interval.

In yet another aspect, the present disclosure provides in some embodiments a display device including the above-mentioned driving circuit.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be triodes, thin film transistors (TFT), field effect transistors (FETs) or any other elements having an identical characteristic. In order to differentiate two electrodes other than a control electrode from each other, one of the two electrodes is called as first electrode and the other is called as second electrode.

In actual use, when the transistor is a triode, the control electrode may be a base, the first electrode may be a collector and the second electrode may be an emitter, or the control electrode may be a base, the first electrode may be an emitter and the second electrode may be a collector.

In actual use, when the transistor is a TFT or FET, the control electrode may be a gate electrode, the first electrode may be a drain electrode and the second electrode may be a source electrode, or the control electrode may be a gate electrode, the first electrode may be a source electrode and the second electrode may be a drain electrode.

Figure 1:
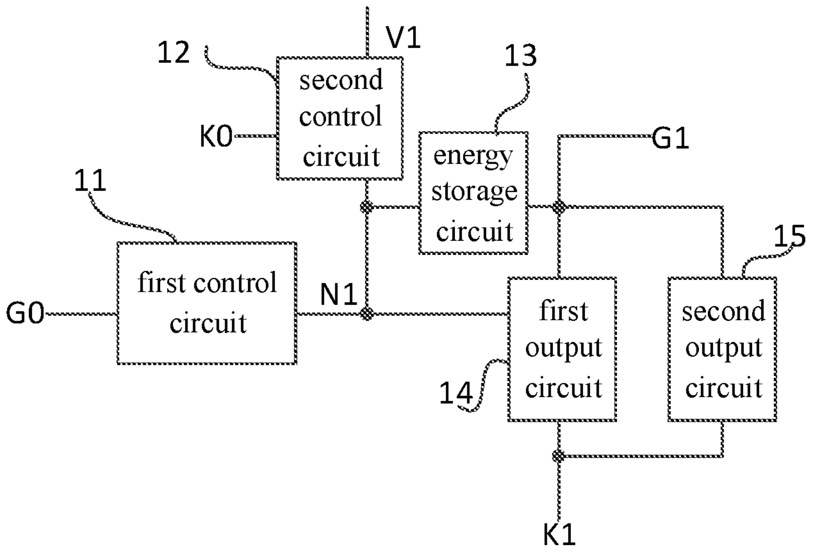
FIG. 1 is a schematic view showing a driving circuit according to one embodiment of the present disclosure.

As shown in FIG. 1, the present disclosure provides in some embodiments a driving circuit, which includes a first control circuit 11, a second control circuit 12, an energy storage circuit 13, a first output circuit 14 and a second output circuit 15. A first end of the energy storage circuit 13 is electrically coupled to a first node N1, a second end of the energy storage circuit 13 is electrically coupled to an output driving signal end G1, and the energy storage circuit 13 is configured to store electric energy. The first control circuit 11 is electrically coupled to an input driving signal end G0 and the first node N1, and configured to control a potential at the first node N1 in accordance with an input driving signal from the input driving signal end G0. The second control circuit 12 is electrically coupled to a control clock signal end K0, a first voltage end V1 and the first node N1, and configured to control the first node N1 to be electrically coupled to the first voltage end V1 under the control of a control clock signal from the control clock signal end K0. The first output circuit 14 is electrically coupled to the first node N1, a first clock signal end K1 and the output driving signal end G1, and configured to control the output driving signal end G1 to be electrically coupled to the first clock signal end K1 under the control of the potential at the first node N1. The second output circuit 15 is electrically coupled to the first clock signal end K1 and the output driving signal end G1, and configured to control the output driving signal end G1 to provide an output driving signal in accordance with a first clock signal from the first clock signal end K1.

In at least one embodiment of the present disclosure, the first voltage end V1 is, but not limited to, a high voltage end.

According to the driving circuit in the embodiments of the present disclosure, the input driving signal, i.e., a gate driving signal which is active at a low level, is converted into the output driving signal, i.e., a gate driving signal which is active at a high level. As a result, it is able to reduce the quantity of transistors adopted by a circuit for generating the gate driving signal which is active at a high level, thereby to provide a narrow bezel, reduce the manufacture cost and simplify the time sequence control.

In the embodiments of the present disclosure, on the basis of an existing gate driving circuit for generating a driving signal which is active at a low level, the above-mentioned driving circuit is added so as to output the driving signal which is active at a high level.

During the operation of the driving circuit in the embodiments of the present disclosure, a driving cycle includes a first stage, a second stage, a third stage and a fourth stage arranged sequentially.

At the first stage, the first control circuit 11 controls the potential at the first node N1 in accordance with the input driving signal from the input driving signal end G0, so that the first output circuit 14 controls the output driving signal end G1 to be electrically coupled to the first clock signal end K1 under the control of the potential at the first node N1.

At the second stage, the energy storage circuit 13 changes the potential at the first node N1, and the first output circuit 14 controls the output driving signal end G1 to be electrically coupled to the first clock signal end K1 continuously under the control of the potential at the first node N1.

At the third stage, the second control circuit 12 controls the first node N1 to be electrically coupled to the first voltage end V1 under the control of the control clock signal from K0, so that the first output circuit 14 controls the output driving signal end G1 to be electrically decoupled from the first clock signal end K1 under the control of the potential at the first node N1.

Within at least a part of time periods at the fourth stage, the second output circuit 15 controls the output driving signal from the output driving signal end G1 to be an inactive voltage signal in accordance with the first clock signal.

In at least one embodiment of the present disclosure, the inactive voltage signal is, but not limited to, a low voltage signal. When the inactive voltage signal is applied to a control electrode of an N-type transistor, the N-type transistor is turned off.

In a possible embodiment of the present disclosure, the first control circuit is further electrically coupled to a second clock signal end, and specifically configured to control the input driving signal end to be electrically coupled to the first node under the control of a second clock signal from the second clock signal end.

Figure 2:
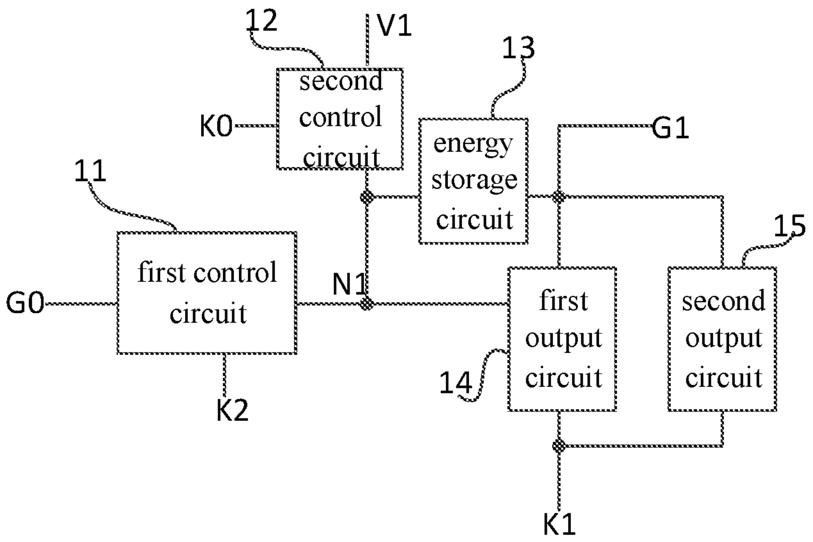
FIG. 2 is another schematic view showing the driving circuit according to one embodiment of the present disclosure.

As shown in FIG. 2, in at least one embodiment of the present disclosure, on the basis of the driving circuit in FIG. 1, the first control circuit 11 is further electrically coupled to the second clock signal end K2, and specifically configured to control the input driving signal end G0 to be electrically coupled to the first node N1 under the control of the second clock signal from K2.

In at least one embodiment of the present disclosure, the second output circuit is further electrically coupled to a second voltage end, and configured to control the output driving signal end to be electrically coupled to the second voltage end under the control of the first clock signal.

Figure 3:
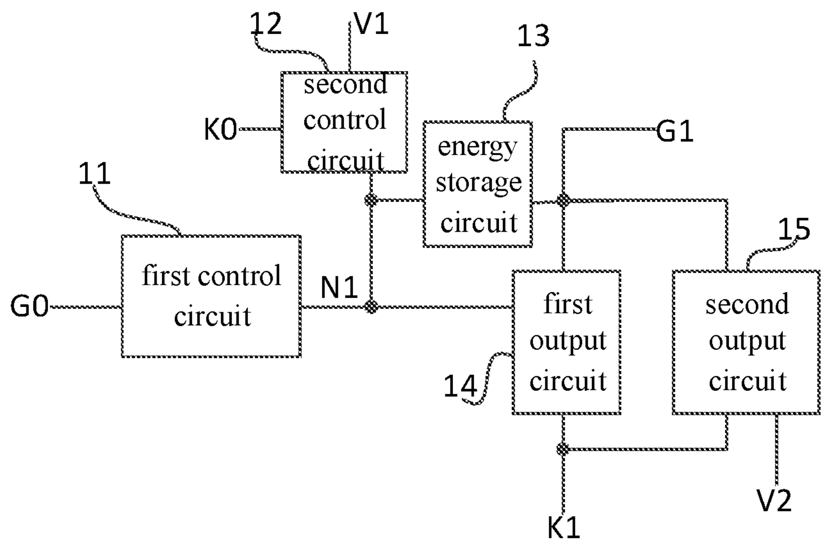
FIG. 3 is yet another schematic view showing the driving circuit according to one embodiment of the present disclosure.

As shown in FIG. 3, in at least one embodiment of the present disclosure, on the basis of the driving circuit in FIG. 1, the second output circuit 15 is further electrically coupled to the second voltage end V2, and configured to control the output driving signal end G1 to be electrically coupled to the second voltage end V2 under the control of the first clock signal.

In a possible embodiment of the present disclosure, the second voltage end V2 is a low voltage end.

Figure 4:
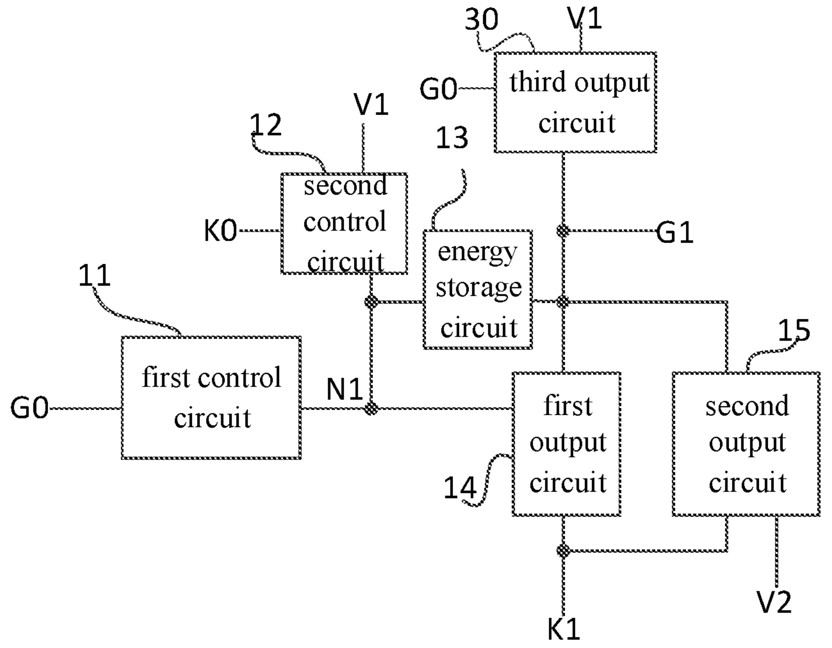
FIG. 4 is still yet another schematic view showing the driving circuit according to one embodiment of the present disclosure.

As shown in FIG. 4, on the basis of the driving circuit in FIG. 1, the driving circuit further includes a third output circuit 30 electrically coupled to the input driving signal end G0, the first voltage end V1 and the output driving signal end G1, and configured to control the output driving signal end G1 to be electrically coupled to the first voltage end V1 under the control of the input driving signal.

In a possible embodiment of the present disclosure, the first voltage end V1 is a high voltage end.

According to the driving circuit in FIG. 4, through the third output circuit 30, it is able to control the output driving signal end G1 to be electrically coupled to the first voltage end V1 when a potential of the input driving signal is a low voltage, thereby to ensure that a potential of the output driving signal from G1 is a high voltage.

In a possible embodiment of the present disclosure, the first control circuit includes a first transistor, a control electrode and a first electrode of which are electrically coupled to the input driving signal end, and a second electrode of which is electrically coupled to the first node.

In a possible embodiment of the present disclosure, the first control circuit includes a first transistor, a control electrode of which is electrically coupled to the second clock signal end, a first electrode of which is electrically coupled to the input driving signal end, and a second electrode of which is electrically coupled to the first node.

In at least one embodiment of the present disclosure, the second control circuit includes a second transistor, a control electrode of which is electrically coupled to the control clock signal end, a first electrode of which is electrically coupled to the first voltage end, and a second electrode of which is electrically coupled to the first node.

In a possible embodiment of the present disclosure, the energy storage circuit includes a storage capacitor, the first output circuit includes a first output transistor, a first end of the storage capacitor is electrically coupled to the first node, a second end of the storage capacitor is electrically coupled to the output driving signal end, a control electrode of the first output transistor is electrically coupled to the first node, a first electrode of the first output transistor is electrically coupled to the output driving signal end, and a second electrode of the first output transistor is electrically coupled to the first clock signal end.

In a possible embodiment of the present disclosure, the second output circuit includes a second output transistor, a control electrode and a first electrode of which are electrically coupled to the first clock signal end, and a second electrode of which is electrically coupled to the output driving signal end.

In a possible embodiment of the present disclosure, the second output circuit includes a second output transistor, a control electrode of which is electrically coupled to the first clock signal end, a first electrode of which is electrically coupled to the second voltage end, and a second electrode of which is electrically coupled to the output driving signal end.

In at least one embodiment of the present disclosure, the third output circuit includes a third output transistor, a control electrode of which is electrically coupled to the input driving signal end, a first electrode of which is electrically coupled to the first voltage end, and a second electrode of which is electrically coupled to the output driving signal end.

Figure 5:
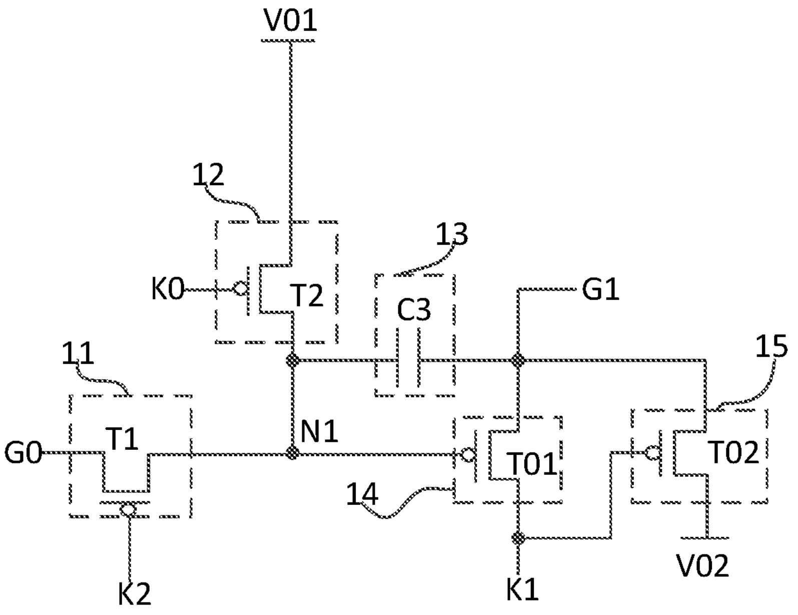
FIG. 5 is a circuit diagram of the driving circuit according to one embodiment of the present disclosure.

As shown in FIG. 5, the driving circuit includes the first control circuit 11, the second control circuit 12, the energy storage circuit 13, the first output circuit 14 and the second output circuit 15.

The first control circuit 11 includes a first transistor T1, a gate electrode of which is electrically coupled to the second clock signal end K2, a source electrode of which is electrically coupled to the input driving signal end G0, and a drain electrode of which is electrically coupled to the first node N1.

The second control circuit 12 includes a second transistor T2, a gate electrode of which is electrically coupled to the control clock signal end K0, a source electrode of which is electrically coupled to a high voltage end V01, and a drain electrode of which is electrically coupled to the first node N1.

The energy storage circuit 13 includes a storage capacitor C3, and the first output circuit 14 includes a first output transistor T01. A first end of the storage capacitor C3 is electrically coupled to the first node N1, and a second end of the storage capacitor C3 is electrically coupled to the output driving signal end G1. A gate electrode of the first output transistor T01 is electrically coupled to the first node N1, a source electrode of the first output transistor T01 is electrically coupled to the output driving signal end G1, and a drain electrode of the first output transistor T01 is electrically coupled to the first clock signal end K1.

The second output circuit 15 includes a second output transistor T02, a gate electrode of which is electrically coupled to the first clock signal end K1, a source electrode of which is electrically coupled to a low voltage end V02, and a drain electrode of which is electrically coupled to the output driving signal end G1.

In the driving circuit in FIG. 5, all the transistors are, but not limited to, p-type TFTs.

Figure 6:
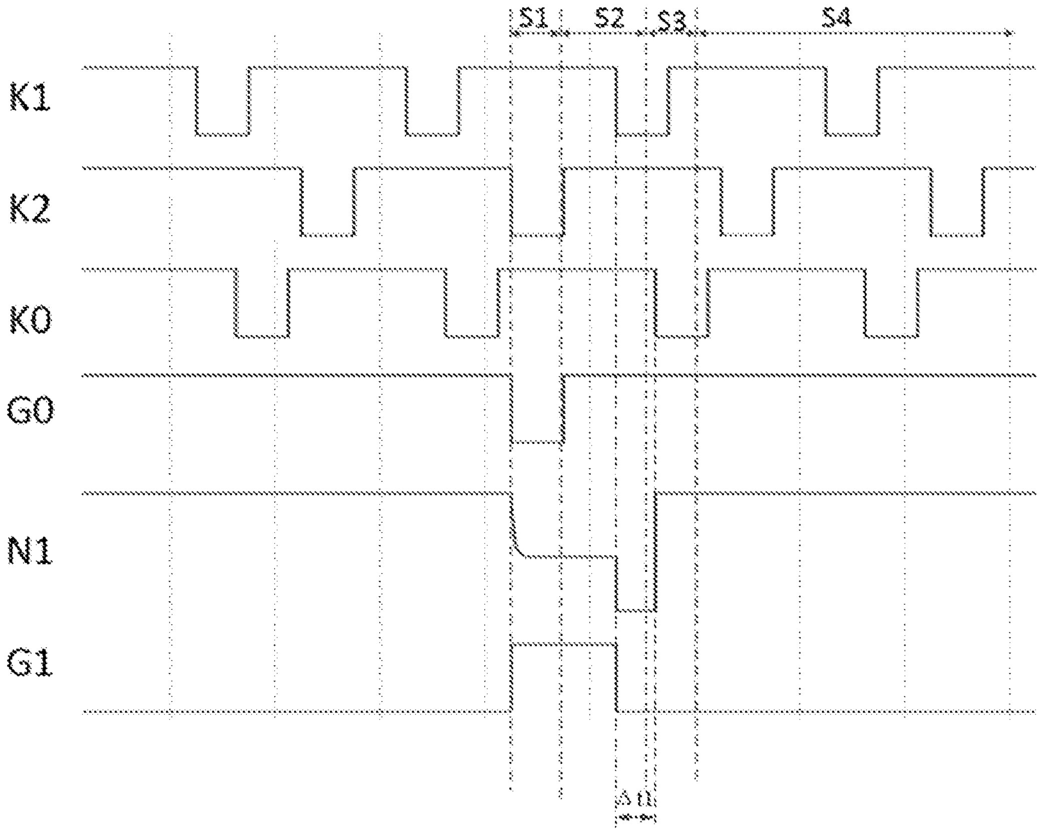
FIG. 6 is a sequence diagram of the driving circuit in FIG. 5.

As shown in FIG. 6, during the operation of the driving circuit in FIG. 5, the driving cycle includes a first stage S1, a second stage S2, a third stage S3 and a fourth stage S4 arranged sequentially.

At the first stage S1, a potential of the second clock signal from K2 is a low voltage, and a potential of the control clock signal from K0 is a high voltage, so as to turn off T2 and turn on T1. A potential of the input driving signal from G0 is a low voltage, and at this time, the potential at N1 is a low voltage, so as to turn on T01. A potential of the first clock signal from K1 is a high voltage, so as to turn off T02. At this time, G1 outputs a high voltage signal.

At the second stage S2, the potential of the first clock signal from K1 is pulled down from a high voltage to a low voltage, so as to turn on T01. G1 outputs a low voltage signal, and due to a bootstrapping effect of C3, the potential at N1 is further pulled down, so as to fully turn on T01, and maintain the potential of the output driving signal from G1 at a very low level. The potential of the second clock signal from K2 is a high voltage, so as to turn off T1.

At the third stage S3, the potential of the control clock signal from K0 is pulled down from a high voltage to a low voltage, so as to turn on T2, pull up the potential at N1 and turn off T01. The voltage of the output driving signal from G1 is not affected by a jump of the potential of the first clock signal from K1, so G1 continues to output a low voltage signal.

Within at least a part of time periods at stage S4, the potential of the first clock signal from K1 is a low voltage. When ripples are generated for the output driving signal from G1 due to coupling or current leakage, T02 is turned on due to the ripples in the case that the potential of the first clock signal from K1 is a low voltage, and the ripples are released so that G1 continues to output a low voltage signal.

Within at least a part of time periods at the fourth stage S4, the potential of the first clock signal from K1 is a low voltage. When there is no ripple for the output driving signal from G1, G1 continues to output a low voltage signal and T02 is turned off.

As shown in FIG. 6, a time difference Δt1 between a falling edge of the first clock signal from K1 and a falling edge of the control clock signal from K0 needs to satisfy the following condition: Δt1 is greater than a sum of a fall time t1 of the first clock signal, a fall time t01 of the control clock signal and a first time interval m1, and Δt1 is smaller than w1−t2−t02−m2, where w1 is a time for which the potential of the first clock signal is maintained as a low voltage, t2 is a rise time of the first clock signal, t02 is a rise time of the control clock signal, m2 is a second time interval, and m1 and m2 may be adjusted in accordance with performance of a display product.

Through the definition of Δt1, the potential of the control clock signal starts to decrease from a high voltage to a low voltage merely when the potential of the first clock signal completely decreases to a low voltage.

Figure 7:
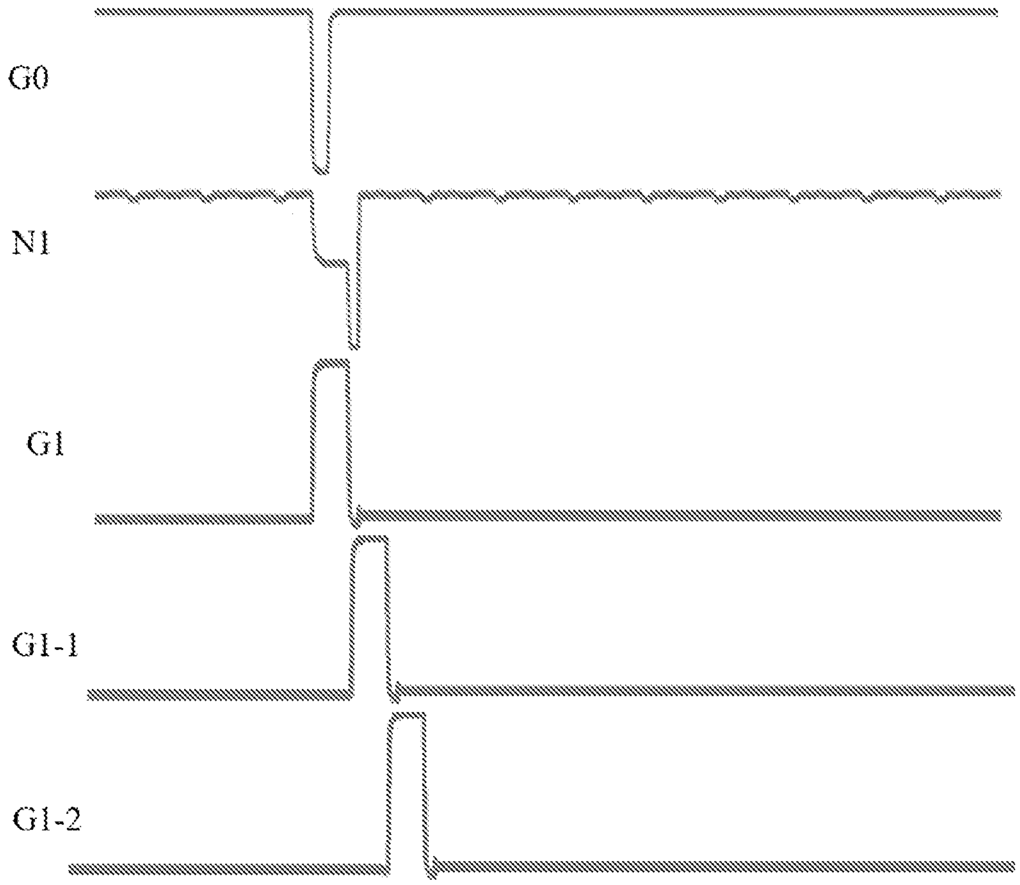
FIG. 7 is a simulation sequence diagram of the driving circuit in FIG. 5.

FIG. 7 is a simulation sequence diagram of the driving circuit in FIG. 5.

In FIG. 7, G1-1 represents a next-level output driving signal end adjacent to G1, and G1-2 represents a next-level output driving signal end adjacent to G1-1.

As shown in FIG. 7, the levels of output driving signal ends output the signals sequentially in a shifted manner, so as to meet the driving requirement on a pixel circuit.

Figure 8:
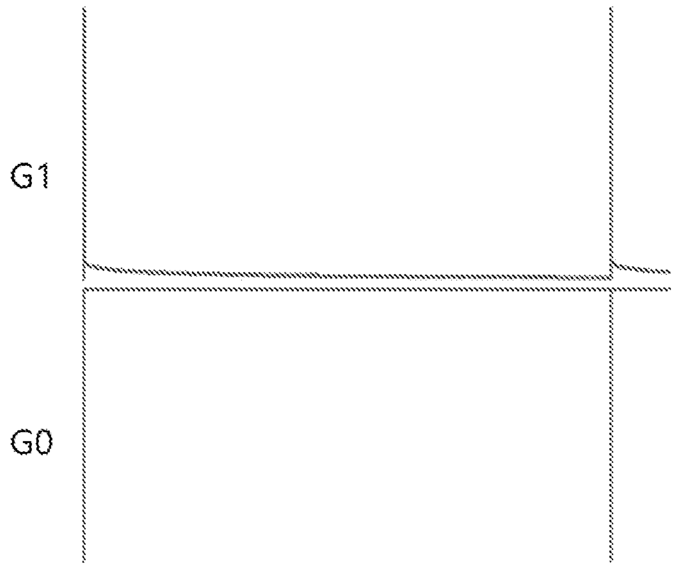
FIG. 8 is a simulation sequence diagram of the driving circuit in FIG. 5 operating at a low frequency.

FIG. 8 is a simulation sequence diagram of the driving circuit in FIG. 5 operating at a low frequency. As shown in FIG. 8, at the low frequency, the driving circuit in FIG. 5 provides the output driving signal stably.

Figure 9:
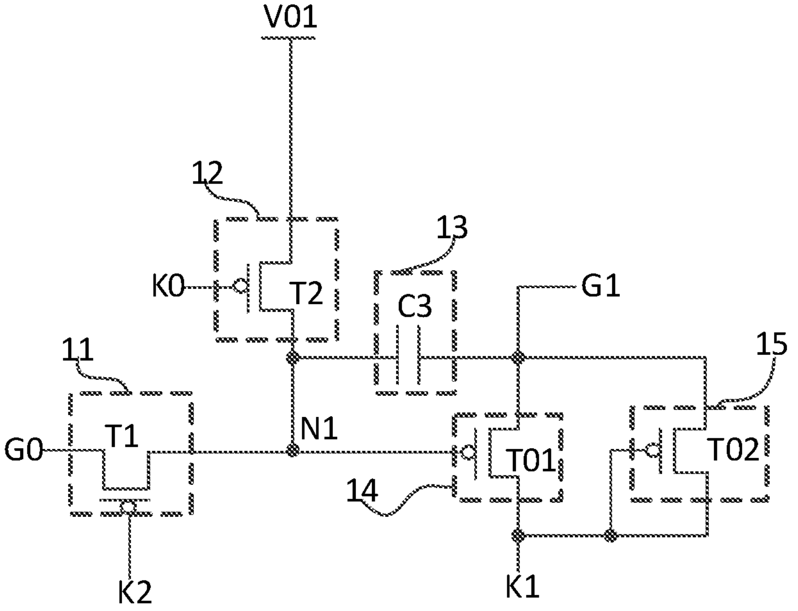
FIG. 9 is another circuit diagram of the driving circuit according to one embodiment of the present disclosure.

As shown in FIG. 9, the driving circuit includes the first control circuit 11, the second control circuit 12, the energy storage circuit 13, the first output circuit 14 and the second output circuit 15.

The first control circuit 11 includes a first transistor T1, a gate electrode of which is electrically coupled to the second clock signal end K2, a source electrode of which is electrically coupled to the input driving signal end G0, and a drain electrode of which is electrically coupled to the first node N1.

The second control circuit 12 includes a second transistor T2, a gate electrode of which is electrically coupled to the control clock signal end K0, a source electrode of which is electrically coupled to a high voltage end V01, and a drain electrode of which is electrically coupled to the first node N1.

The energy storage circuit 13 includes a storage capacitor C3, and the first output circuit 14 includes a first output transistor T01. A first end of the storage capacitor C3 is electrically coupled to the first node N1, and a second end of the storage capacitor C3 is electrically coupled to the output driving signal end G1. A gate electrode of the first output transistor T01 is electrically coupled to the first node N1, a source electrode of the first output transistor T01 is electrically coupled to the output driving signal end G1, and a drain electrode of the first output transistor T01 is electrically coupled to the first clock signal end K1.

The second output circuit 15 includes a second output transistor T02, a gate electrode and a source electrode of which are electrically coupled to the first clock signal end K1, and a drain electrode of which is electrically coupled to the output driving signal end G1.

In the driving circuit in FIG. 9, all the transistors are, but not limited to, p-type TFTs.

As shown in FIG. 6, during the operation of the driving circuit in FIG. 9, the driving cycle includes a first stage S1, a second stage S2, a third stage S3 and a fourth stage S4 arranged sequentially.

At the first stage S1, a potential of the second clock signal from K2 is a low voltage, and a potential of the control clock signal from K0 is a high voltage, so as to turn off T2 and turn on T1. A potential of the input driving signal from G0 is a low voltage, and at this time, the potential at N1 is a low voltage, so as to turn on T01. A potential of the first clock signal from K1 is a high voltage, and at this time, G1 outputs a high voltage signal.

At the second stage S2, the potential of the first clock signal from K1 is pulled down from a high voltage to a low voltage, so as to turn on T01. G1 outputs a low voltage signal, and due to a bootstrapping effect of C3, the potential at N1 is further pulled down, so as to fully turn on T01, and maintain the potential of the output driving signal from G1 at a very low level. The potential of the second clock signal from K2 is a high voltage, so as to turn off T1.

At the third stage S3, the potential of the control clock signal from K0 is pulled down from a high voltage to a low voltage, so as to turn on T2, pull up the potential at N1 and turn off T01. The voltage of the output driving signal from G1 is not affected by a jump of the potential of the first clock signal from K1, so G1 continues to output a low voltage signal.

Within at least a part of time periods at stage S4, the potential of the first clock signal from K1 is a low voltage. When ripples are generated for the output driving signal from G1 due to coupling or current leakage, T02 is turned on due to the ripples in the case that the potential of the first clock signal from K1 is a low voltage, and the ripples are released so that G1 continues to output a low voltage signal.

Within at least a part of time periods at the fourth stage S4, the potential of the first clock signal from K1 is a low voltage. When there is no ripple for the output driving signal from G1, G1 continues to output a low voltage signal and T02 is turned off.

Figure 10:
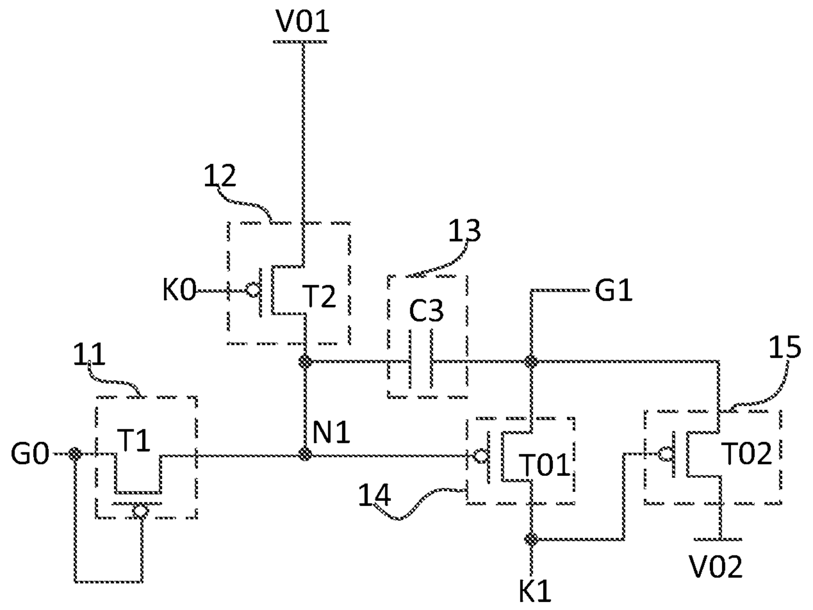
FIG. 10 is yet another circuit diagram of the driving circuit according to one embodiment of the present disclosure.

As shown in FIG. 10, the driving circuit includes the first control circuit 11, the second control circuit 12, the energy storage circuit 13, the first output circuit 14 and the second output circuit 15.

The first control circuit 11 includes a first transistor T1, a gate electrode and a source electrode of which are electrically coupled to the input driving signal end G1, and a drain electrode of which is electrically coupled to the first node N1.

The second control circuit 12 includes a second transistor T2, a gate electrode of which is electrically coupled to the control clock signal end K0, a source electrode of which is electrically coupled to a high voltage end V01, and a drain electrode of which is electrically coupled to the first node N1.

The energy storage circuit 13 includes a storage capacitor C3, and the first output circuit 14 includes a first output transistor T01. A first end of the storage capacitor C3 is electrically coupled to the first node N1, and a second end of the storage capacitor C3 is electrically coupled to the output driving signal end G1. A gate electrode of the first output transistor T01 is electrically coupled to the first node N1, a source electrode of the first output transistor T01 is electrically coupled to the output driving signal end G1, and a drain electrode of the first output transistor T01 is electrically coupled to the first clock signal end K1.

The second output circuit 15 includes a second output transistor T02, a gate electrode of which is electrically coupled to the first clock signal end K1, a source electrode of which is electrically coupled to a low voltage end V02, and a drain electrode of which is electrically coupled to the output driving signal end G1.

In the driving circuit in FIG. 10, all the transistors are, but not limited to, p-type TFTs.

As shown in FIG. 6, during the operation of the driving circuit in FIG. 10, the driving cycle includes a first stage S1, a second stage S2, a third stage S3 and a fourth stage S4 arranged sequentially.

At the first stage S1, a potential of the control clock signal from K0 is a high voltage, so as to turn off T2. A potential of the input driving signal from G0 is a low voltage so as to turn on T1, and at this time, the potential at N1 is a low voltage so as to turn on T01. A potential of the first clock signal from K1 is a high voltage, so as to turn off T02. At this time, G1 outputs a high voltage signal.

At the second stage S2, the potential of the first clock signal from K1 is pulled down from a high voltage to a low voltage, so as to turn on T01. G1 outputs a low voltage signal, and due to a bootstrapping effect of C3, the potential at N1 is further pulled down, so as to fully turn on T01, and maintain the potential of the output driving signal from G1 at a very low level. The potential of the input driving signal from G0 is a high voltage, so as to turn off T1.

At the third stage S3, the potential of the control clock signal from K0 is pulled down from a high voltage to a low voltage, so as to turn on T2, pull up the potential at N1 and turn off T01. The voltage of the output driving signal from G1 is not affected by a jump of the potential of the first clock signal from K1, so G1 continues to output a low voltage signal.

Within at least a part of time periods at stage S4, the potential of the first clock signal from K1 is a low voltage. When ripples are generated for the output driving signal from G1 due to coupling or current leakage, T02 is turned on due to the ripples in the case that the potential of the first clock signal from K1 is a low voltage, and the ripples are released so that G1 continues to output a low voltage signal.

Within at least a part of time periods at the fourth stage S4, the potential of the first clock signal from K1 is a low voltage. When there is no ripple for the output driving signal from G1, G1 continues to output a low voltage signal and T02 is turned off.

Figure 11:
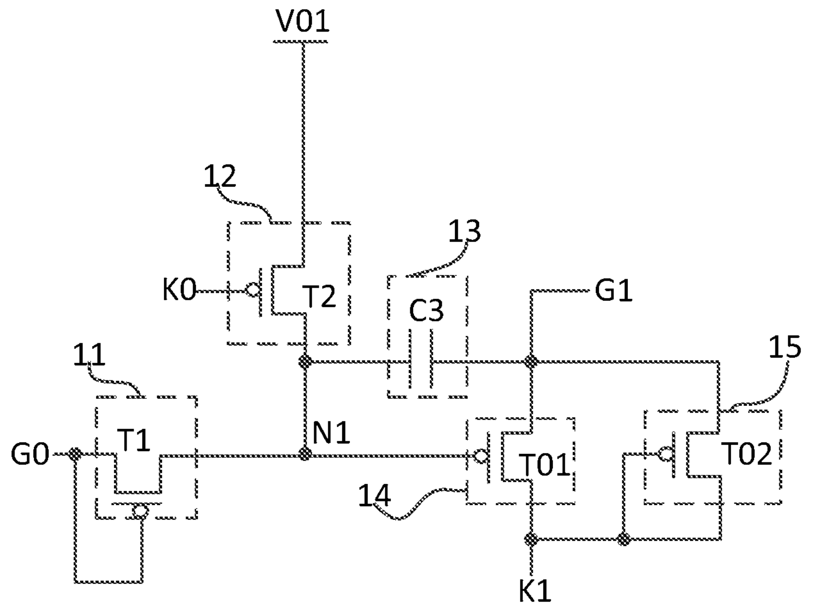
FIG. 11 is still yet another circuit diagram of the driving circuit according to one embodiment of the present disclosure.

As shown in FIG. 11, the driving circuit includes the first control circuit 11, the second control circuit 12, the energy storage circuit 13, the first output circuit 14 and the second output circuit 15.

The first control circuit 11 includes a first transistor T1, a gate electrode and a source electrode of which are electrically coupled to the input driving signal end G0, and a drain electrode of which is electrically coupled to the first node N1.

The second control circuit 12 includes a second transistor T2, a gate electrode of which is electrically coupled to the control clock signal end K0, a source electrode of which is electrically coupled to a high voltage end V01, and a drain electrode of which is electrically coupled to the first node N1.

The energy storage circuit 13 includes a storage capacitor C3, and the first output circuit 14 includes a first output transistor T01. A first end of the storage capacitor C3 is electrically coupled to the first node N1, and a second end of the storage capacitor C3 is electrically coupled to the output driving signal end G1. A gate electrode of the first output transistor T01 is electrically coupled to the first node N1, a source electrode of the first output transistor T01 is electrically coupled to the output driving signal end G1, and a drain electrode of the first output transistor T01 is electrically coupled to the first clock signal end K1.

The second output circuit 15 includes a second output transistor T02, a gate electrode and a source electrode of which are electrically coupled to the first clock signal end K1, and a drain electrode of which is electrically coupled to the output driving signal end G1.

In the driving circuit in FIG. 11, all the transistors are, but not limited to, p-type TFTs.

As shown in FIG. 6, during the operation of the driving circuit in FIG. 11, the driving cycle includes a first stage S1, a second stage S2, a third stage S3 and a fourth stage S4 arranged sequentially.

At the first stage S1, a potential of the control clock signal from K0 is a high voltage, so as to turn off T2. A potential of the input driving signal from G0 is a low voltage so as to turn on T1, and at this time, the potential at N1 is a low voltage, so as to turn on T01. A potential of the first clock signal from K1 is a high voltage, and at this time, G1 outputs a high voltage signal.

At the second stage S2, the potential of the first clock signal from K1 is pulled down from a high voltage to a low voltage, so as to turn on T01. G1 outputs a low voltage signal, and due to a bootstrapping effect of C3, the potential at N1 is further pulled down, so as to fully turn on T01, and maintain the potential of the output driving signal from G1 at a very low level. The potential of the input driving signal from G0 is a high voltage, so as to turn off T1.

At the third stage S3, the potential of the control clock signal from K0 is pulled down from a high voltage to a low voltage, so as to turn on T2, pull up the potential at N1 and turn off T01. The voltage of the output driving signal from G1 is not affected by a jump of the potential of the first clock signal from K1, so G1 continues to output a low voltage signal.

Within at least a part of time periods at stage S4, the potential of the first clock signal from K1 is a low voltage. When ripples are generated for the output driving signal from G1 due to coupling or current leakage, T02 is turned on due to the ripples in the case that the potential of the first clock signal from K1 is a low voltage, and the ripples are released so that G1 continues to output a low voltage signal.

Within at least a part of time periods at the fourth stage S4, the potential of the first clock signal from K1 is a low voltage. When there is no ripple for the output driving signal from G1, G1 continues to output a low voltage signal and T02 is turned off.

Figure 12:
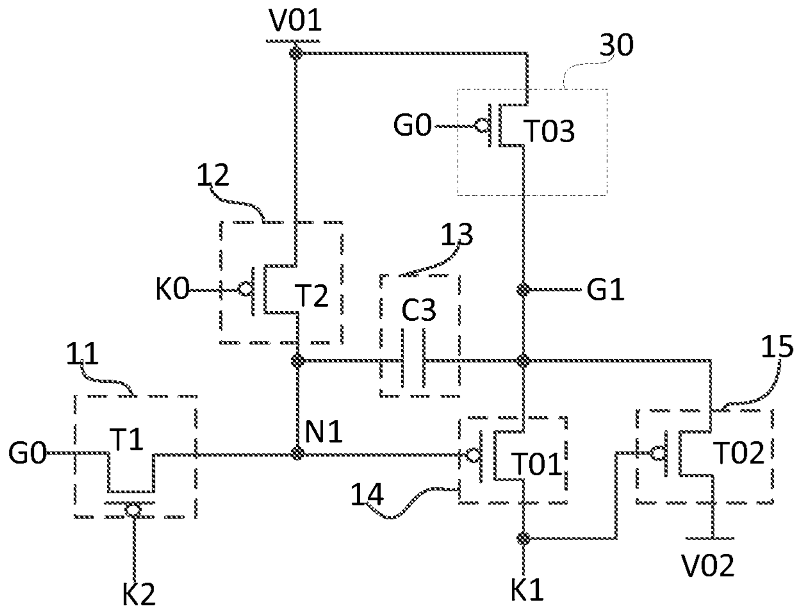
FIG. 12 is still yet another circuit diagram of the driving circuit according to one embodiment of the present disclosure.

As shown in FIG. 12, the driving circuit includes the first control circuit 11, the second control circuit 12, the energy storage circuit 13, the first output circuit 14, the second output circuit 15 and the third output circuit 30.

The first control circuit 11 includes a first transistor T1, a gate electrode of which is electrically coupled to the second clock signal end K2, a source electrode of which is electrically coupled to the input driving signal end G0, and a drain electrode of which is electrically coupled to the first node N1.

The second control circuit 12 includes a second transistor T2, a gate electrode of which is electrically coupled to the control clock signal end K0, a source electrode of which is electrically coupled to a high voltage end V01, and a drain electrode of which is electrically coupled to the first node N1.

The energy storage circuit 13 includes a storage capacitor C3, and the first output circuit 14 includes a first output transistor T01. A first end of the storage capacitor C3 is electrically coupled to the first node N1, and a second end of the storage capacitor C3 is electrically coupled to the output driving signal end G1. A gate electrode of the first output transistor T01 is electrically coupled to the first node N1, a source electrode of the first output transistor T01 is electrically coupled to the output driving signal end G1, and a drain electrode of the first output transistor T01 is electrically coupled to the first clock signal end K1.

The second output circuit 15 includes a second output transistor T02, a gate electrode of which is electrically coupled to the first clock signal end K1, a source electrode of which is electrically coupled to a low voltage end V02, and a drain electrode of which is electrically coupled to the output driving signal end G1.

The third output circuit 30 includes a third output transistor T03, a gate electrode of which is electrically coupled to the input driving signal end G0, a source electrode of which is electrically coupled to the high voltage end V01, and a drain electrode of which is electrically coupled to the output driving signal end G1.

In the driving circuit in FIG. 12, all the transistors are, but not limited to, p-type TFTs.

The driving circuit in FIG. 12 differs from that in FIG. 5 in that T03 is added.

During the operation of the driving circuit in FIG. 12, when the potential of the input driving signal from G0 is a low voltage, T03 is turned on, so as to enable G1 to be electrically coupled to V01. When the potential of the input driving signal from G0 is a high voltage, T03 is turned off.

Figure 13:
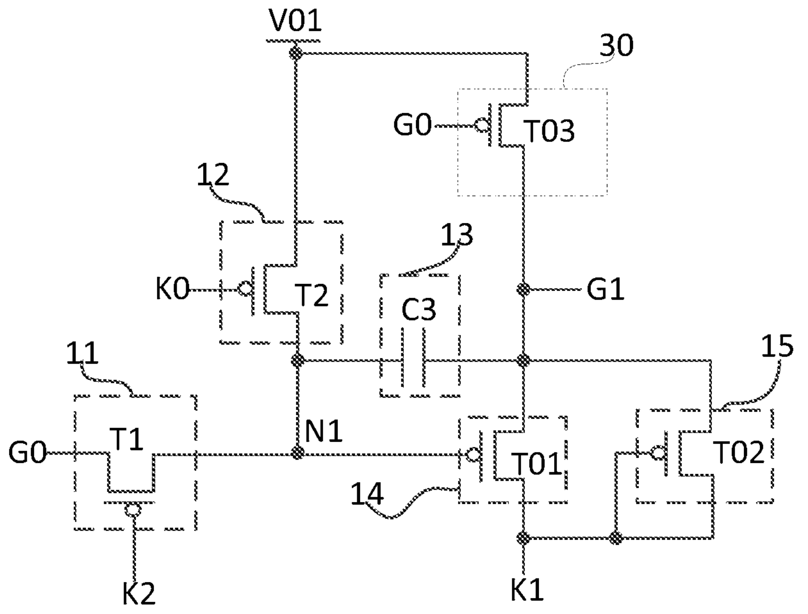
FIG. 13 is still yet another circuit diagram of the driving circuit according to one embodiment of the present disclosure.

As shown in FIG. 13, the driving circuit includes the first control circuit 11, the second control circuit 12, the energy storage circuit 13, the first output circuit 14, the second output circuit 15 and the third output circuit 30.

The first control circuit 11 includes a first transistor T1, a gate electrode of which is electrically coupled to the second clock signal end K2, a source electrode of which is electrically coupled to the input driving signal end G0, and a drain electrode of which is electrically coupled to the first node N1.

The second control circuit 12 includes a second transistor T2, a gate electrode of which is electrically coupled to the control clock signal end K0, a source electrode of which is electrically coupled to a high voltage end V01, and a drain electrode of which is electrically coupled to the first node N1.

The energy storage circuit 13 includes a storage capacitor C3, and the first output circuit 14 includes a first output transistor T01. A first end of the storage capacitor C3 is electrically coupled to the first node N1, and a second end of the storage capacitor C3 is electrically coupled to the output driving signal end G1. A gate electrode of the first output transistor T01 is electrically coupled to the first node N1, a source electrode of the first output transistor T01 is electrically coupled to the output driving signal end G1, and a drain electrode of the first output transistor T01 is electrically coupled to the first clock signal end K1.

The second output circuit 15 includes a second output transistor T02, a gate electrode and a source electrode of which are electrically coupled to the first clock signal end K1, and a drain electrode of which is electrically coupled to the output driving signal end G1.

The third output circuit 30 includes a third output transistor T03, a gate electrode of which is electrically coupled to the input driving signal end G0, a source electrode of which is electrically coupled to the high voltage end V01, and a drain electrode of which is electrically coupled to the output driving signal end G1.

In the driving circuit in FIG. 13, all the transistors are, but not limited to, p-type TFTs.

The driving circuit in FIG. 13 differs from that in FIG. 9 in that T03 is added.

During the operation of the driving circuit in FIG. 13, when the potential of the input driving signal from G0 is a low voltage, T03 is turned on, so as to enable G1 to be electrically coupled to V01. When the potential of the input driving signal from G0 is a high voltage, T03 is turned off.

Figure 14:
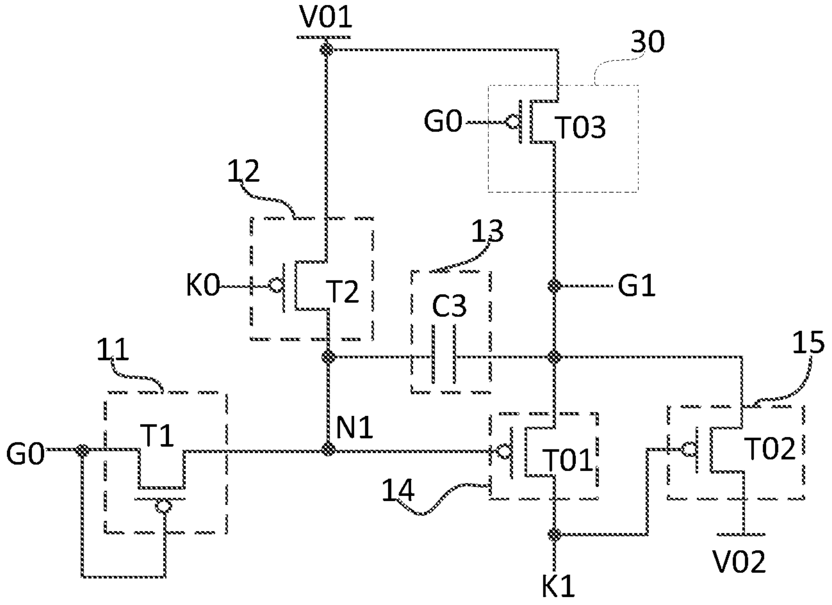
FIG. 14 is still yet another circuit diagram of the driving circuit according to one embodiment of the present disclosure.

As shown in FIG. 14, the driving circuit includes the first control circuit 11, the second control circuit 12, the energy storage circuit 13, the first output circuit 14, the second output circuit 15 and the third output circuit 30.

The first control circuit 11 includes a first transistor T1, a gate electrode and a source electrode of which are electrically coupled to the input driving signal end G0, and a drain electrode of which is electrically coupled to the first node N1.

The second control circuit 12 includes a second transistor T2, a gate electrode of which is electrically coupled to the control clock signal end K0, a source electrode of which is electrically coupled to a high voltage end V01, and a drain electrode of which is electrically coupled to the first node N1.

The energy storage circuit 13 includes a storage capacitor C3, and the first output circuit 14 includes a first output transistor T01. A first end of the storage capacitor C3 is electrically coupled to the first node N1, and a second end of the storage capacitor C3 is electrically coupled to the output driving signal end G1. A gate electrode of the first output transistor T01 is electrically coupled to the first node N1, a source electrode of the first output transistor T01 is electrically coupled to the output driving signal end G1, and a drain electrode of the first output transistor T01 is electrically coupled to the first clock signal end K1.

The second output circuit 15 includes a second output transistor T02, a gate electrode of which is electrically coupled to the first clock signal end K1, a source electrode of which is electrically coupled to a low voltage end V02, and a drain electrode of which is electrically coupled to the output driving signal end G1.

The third output circuit 30 includes a third output transistor T03, a gate electrode of which is electrically coupled to the input driving signal end G0, a source electrode of which is electrically coupled to the high voltage end V01, and a drain electrode of which is electrically coupled to the output driving signal end G1.

In the driving circuit in FIG. 14, all the transistors are, but not limited to, p-type TFTs.

The driving circuit in FIG. 14 differs from that in FIG. 10 in that T03 is added.

During the operation of the driving circuit in FIG. 14, when the potential of the input driving signal from G0 is a low voltage, T03 is turned on, so as to enable G1 to be electrically coupled to V01. When the potential of the input driving signal from G0 is a high voltage, T03 is turned off.

Figure 15:
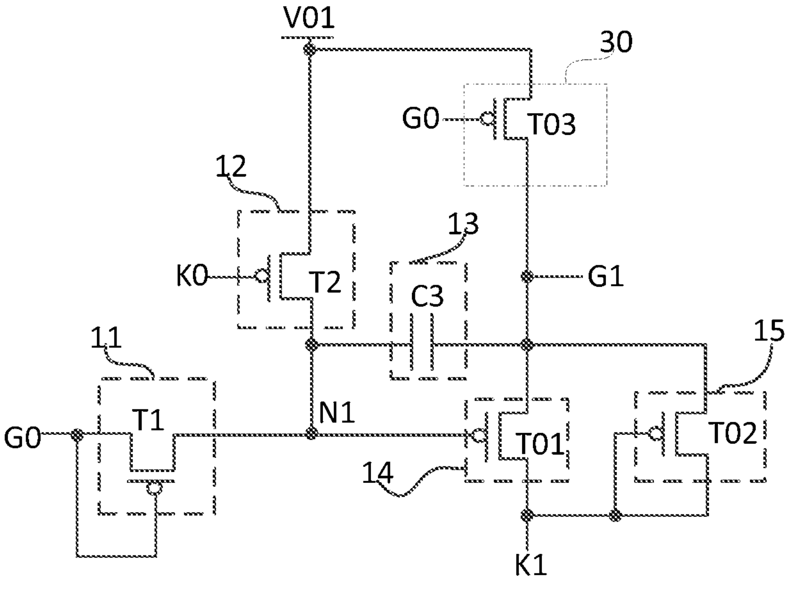
FIG. 15 is still yet another circuit diagram of the driving circuit according to one embodiment of the present disclosure.

As shown in FIG. 15, the driving circuit includes the first control circuit 11, the second control circuit 12, the energy storage circuit 13, the first output circuit 14, the second output circuit 15 and the third output circuit 30.

The first control circuit 11 includes a first transistor T1, a gate electrode and a source electrode of which are electrically coupled to the input driving signal end G0, and a drain electrode of which is electrically coupled to the first node N1.

The second control circuit 12 includes a second transistor T2, a gate electrode of which is electrically coupled to the control clock signal end K0, a source electrode of which is electrically coupled to a high voltage end V01, and a drain electrode of which is electrically coupled to the first node N1.

The energy storage circuit 13 includes a storage capacitor C3, and the first output circuit 14 includes a first output transistor T01. A first end of the storage capacitor C3 is electrically coupled to the first node N1, and a second end of the storage capacitor C3 is electrically coupled to the output driving signal end G1. A gate electrode of the first output transistor T01 is electrically coupled to the first node N1, a source electrode of the first output transistor T01 is electrically coupled to the output driving signal end G1, and a drain electrode of the first output transistor T01 is electrically coupled to the first clock signal end K1.

The second output circuit 15 includes a second output transistor T02, a gate electrode and a source electrode of which are electrically coupled to the first clock signal end K1, and a drain electrode of which is electrically coupled to the output driving signal end G1.

The third output circuit 30 includes a third output transistor T03, a gate electrode of which is electrically coupled to the input driving signal end G0, a source electrode of which is electrically coupled to the high voltage end V01, and a drain electrode of which is electrically coupled to the output driving signal end G1.

In the driving circuit in FIG. 15, all the transistors are, but not limited to, p-type TFTs.

The driving circuit in FIG. 15 differs from that in FIG. 11 in that T03 is added.

During the operation of the driving circuit in FIG. 15, when the potential of the input driving signal from G0 is a low voltage, T03 is turned on, so as to enable G1 to be electrically coupled to V01. When the potential of the input driving signal from G0 is a high voltage, T03 is turned off.

Figure 16:
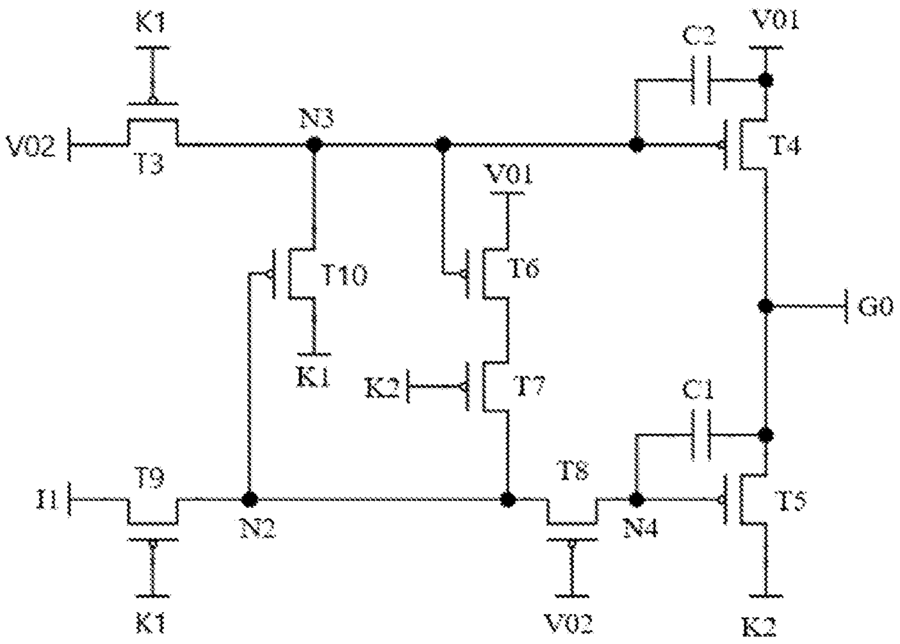
FIG. 16 is a circuit diagram of a signal generation circuit for generating a driving signal which is active at a low voltage according to one embodiment of the present disclosure.

As shown in FIG. 16, a signal generation circuit for generating a driving signal which is active at a low level includes a third transistor T3, a fourth transistor T4, a fifth transistor T5, a sixth transistor T6, a seventh transistor T7, an eighth transistor T8, a ninth transistor T9, a tenth transistor T10, a first capacitor C1 and a second capacitor C2.

A gate electrode of T9 is electrically coupled to a first clock signal end K1, a source electrode of T9 is electrically coupled to an input end I1, and a drain electrode of T9 is electrically coupled to a second node N2.

A gate electrode of T10 is electrically coupled to the second node N2, a source electrode of T10 is electrically coupled to the first clock signal end K1, and a drain electrode of T10 is electrically coupled to a third node N3.

A gate electrode of T3 is electrically coupled to the first clock signal end K1, a source electrode of T3 is electrically coupled to a low voltage end V02, and a drain electrode of T3 is electrically coupled to the third node N3.

A gate electrode of T4 is electrically coupled to the third node N3, a source electrode of T4 is electrically coupled to a high voltage end V01, and a drain electrode of T4 is electrically coupled to an input driving signal end G0.

A gate electrode of T5 is electrically coupled to a fourth node N4, a source electrode of T5 is electrically coupled to a second clock signal end K2, and a drain electrode of T5 is electrically coupled to the input driving signal end G0.

A gate electrode of T6 is electrically coupled to the third node N3, a source electrode of T6 is electrically coupled to the high voltage end V01, and a drain electrode of T6 is electrically coupled to a source electrode of T7.

A gate electrode of T7 is electrically coupled to the second clock signal end K2, and a drain electrode of T7 is electrically coupled to the second node N2.

A gate electrode of T8 is electrically coupled to the low voltage end V02, a source electrode of T8 is electrically coupled to the second node N2, and a drain electrode of T8 is electrically coupled to the fourth node N4.

A first end of C1 is electrically coupled to the fourth node N4, and a second end of C1 is electrically coupled to the input driving signal end G0.

A first end of C2 is electrically coupled to the third node N3, and a second end of C2 is electrically coupled to the high voltage end V02.

In the signal generation circuit in FIG. 16, all the transistors are, but not limited to, p-type TFTs.

Figure 17:
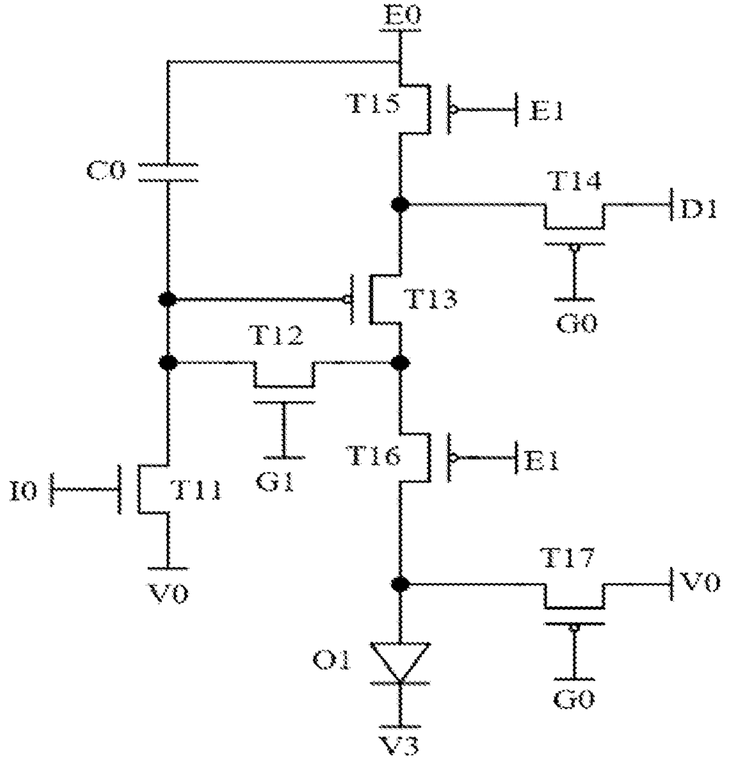
FIG. 17 is a circuit diagram of a related LTPO pixel circuit according to one embodiment of the present disclosure.

As shown in FIG. 17, a related LTPO pixel circuit includes an eleventh transistor T11, a twelfth transistor T12, a thirteenth transistor T13, a fourteenth transistor T14, a fifteenth transistor T15, a sixteenth transistor T16, a seventeenth transistor T17, a capacitor C0 and an organic light-emitting diode O1.

A gate electrode of T11 is electrically coupled to an initial control end 10, a source electrode of T11 is electrically coupled to an initial voltage end V0, and a drain electrode of T11 is electrically coupled to a gate electrode of T13.

A gate electrode of T12 is electrically coupled to an output driving signal end G1, a source electrode of T12 is electrically coupled to the gate electrode of T13, and a drain electrode of T12 is electrically coupled to a drain electrode of T13.

A gate electrode of T14 is electrically coupled to an input driving signal end G0, a source electrode of T14 is electrically coupled to a data line DI, and a drain electrode of T14 is electrically coupled to a source electrode of T13.

A gate electrode of T15 is electrically coupled to a light-emission control signal end E1, a source electrode of T15 is electrically coupled to a power source voltage end E0, and a drain electrode of T15 is electrically coupled to the source electrode of T13.

A gate electrode of T16 is electrically coupled to the light-emission control signal end E1, a source electrode of T16 is electrically coupled to the drain electrode of T13, a drain electrode of T16 is electrically coupled to an anode of O1, and a cathode of O1 is configured to receive a low voltage signal V3.

A gate electrode of T17 is electrically coupled to the input driving signal end G0, a source electrode of T17 is electrically coupled to the initial voltage end V0, and a drain electrode of T17 is electrically coupled to the anode of O1.

A first end of C0 is electrically coupled to the power source voltage end E0, and a second end of C0 is electrically coupled to the gate electrode of T13.

In the LTPO pixel circuit in FIGS. 17, T11 and T12 are both n-type TFTs, and T13, T14, T15, T16 and T17 are all p-type TFTs.

In the LTPO pixel circuit in FIG. 17, 10 is electrically coupled to an adjacent previous-level output driving signal end, the input driving signal is a gate driving signal which is active at a low level, the output driving signal is a gate driving signal which is active at a high level, and the light-emission control signal end E1 is configured to provide a light-emission control signal.

Figure 18:
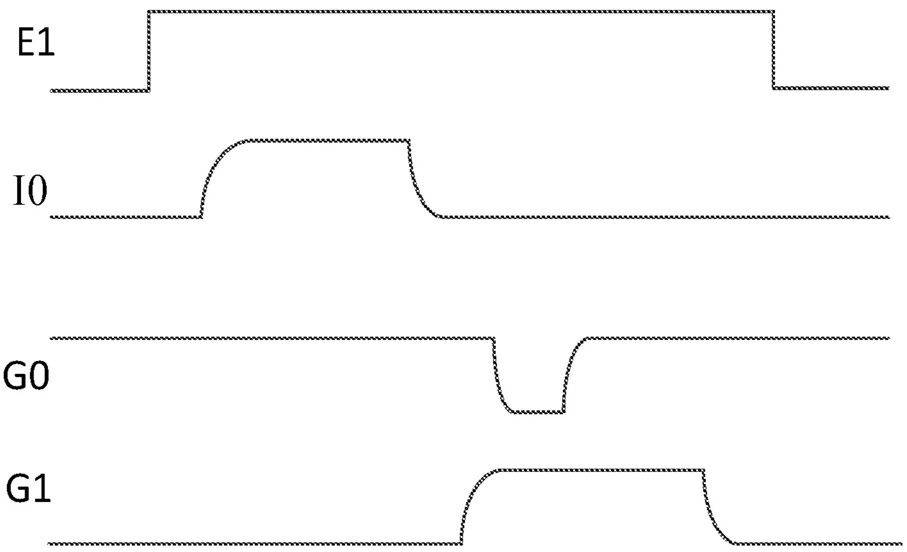
FIG. 18 is a sequence diagram of the LTPO pixel circuit in FIG. 17.

FIG. 18 is a sequence diagram of the LTPO pixel circuit in FIG. 17.

The present disclosure further provides in some embodiments a driving method for the above-mentioned driving circuit. A driving cycle includes a first stage, a second stage and a third stage arranged sequentially. The driving method includes: at a first stage, controlling, by the first control circuit, a potential at the first node in accordance with the input driving signal from the input driving signal end, and controlling, by the first output circuit, the output driving signal end to be electrically coupled to the first clock signal end under the control of the potential at the first node; at a second stage, changing, by the energy storage circuit, the potential at the first node, and controlling, by the first output circuit, the output driving signal end to be electrically coupled to the first clock signal end continuously under the control of the potential at the first node; and at a third stage, controlling, by the second control circuit, the first node to be electrically coupled to the first voltage end under the control of the control clock signal, and controlling, by the first output circuit, the output driving signal end to be electrically decoupled from the first clock signal end under the potential at the first node.

According to the embodiments of the present disclosure, the input driving signal is converted by the driving circuit into a the output driving signal, the input driving signal is a gate driving signal which is active at a low level, and the output driving signal is a gate driving signal which is active at a high level.

In at least one embodiment of the present disclosure, the driving cycle further includes a fourth stage after the third stage, and the driving method further includes, within at least a part of time periods at the fourth stage, controlling, by the second output circuit, the output driving signal from the output driving signal end to be an inactive voltage signal in accordance with the first clock signal.

In a possible embodiment of the present disclosure, the driving circuit further includes a third output circuit, and the driving method further includes, at the first stage, controlling, by the third output circuit, the output driving signal end to be electrically coupled to the first voltage end under the control of the input driving signal.

In a possible embodiment of the present disclosure, the first voltage end is a high voltage end.

Through the third output circuit, it is able to control the output driving signal end to be electrically coupled to the first voltage end when the potential of the input driving signal is a low voltage, thereby to ensure that the potential of the output driving signal is a high voltage.

In a possible embodiment of the present disclosure, Δt1 is greater than a sum of a fall time t1 of the first clock signal, a fall time t01 of the control clock signal and a first time interval m1, and Δt1 is smaller than w1−t2−t02−m2, so that the potential of the control clock signal starts to decrease from a high voltage to a low voltage merely when the potential of the first clock signal completely decreases to a low voltage, where Δt1 is a time difference between a falling edge of the first clock signal and a falling edge of the control clock signal, w1 is a time for which a potential of the first clock signal is maintained as a low voltage, t2 is a rise time of the first clock signal, t02 is a rise time of the control clock signal, and m2 is a second time interval.

The present disclosure further provides in some embodiments a display device including the above-mentioned driving circuit.

According to the display device in the embodiments of the present disclosure, when the control clock signal end of the driving circuit, which is configured to provide an output driving signal to pixel circuits in odd-numbered rows, is electrically coupled to a third clock signal end, and when the control clock signal end of the driving circuit, which is configured to provide an output driving signal to pixel circuits in even-numbered rows, is electrically coupled to a fourth clock signal end.

Figure 19:
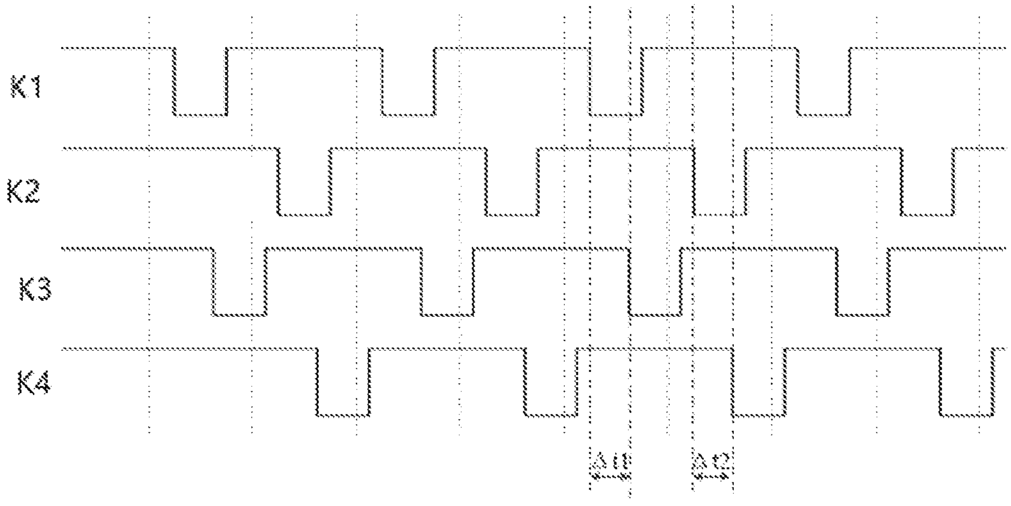
FIG. 19 is a sequence diagram of clock signals.

FIG. 19 is a sequence diagram of a first clock signal from a first clock signal end K1, a second clock signal from a second clock signal end K2, a third clock signal from a third clock signal end K3, and a fourth clock signal from a fourth clock signal end K4.

As shown in FIG. 19, Δt1 represents a time difference between a falling edge of the first clock signal from K1 and a falling edge of the third clock signal from K3, and Δt2 represents a time difference between a falling edge of the second clock signal from K2 and a falling edge of the fourth clock signal from K4. Δt2 needs to satisfy the following condition: Δt2 is greater than a sum of a fall time t3 of the second clock signal, a fall time t03 of the fourth clock signal and a first time interval m1, and Δt1 is smaller than w2−t4−t04−m2, where w2 is a time for which a potential of the second clock signal is maintained as a low voltage, t4 is a rise time of the second clock signal, t04 is a rise time of the fourth clock signal, m2 is a second time interval, and m1 and m2 may be adjusted in accordance with performance of a display product.

Through the definition of Δt2, the potential of the fourth clock signal starts to decrease from a high voltage to a low voltage merely when the potential of the second clock signal completely decreases to a low voltage.

The display device in the embodiments of the present disclosure may be any product or member having a display function, e.g., mobile phone, tablet computer, television, display, laptop computer, digital photo frame or navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A driving circuit, comprising a first control circuit, a second control circuit, an energy storage circuit, a first output circuit and a second output circuit, wherein a first end of the energy storage circuit is electrically coupled to a first node, a second end of the energy storage circuit is electrically coupled to an output driving signal end, and the energy storage circuit is configured to store electric energy;

the first control circuit is electrically coupled to an input driving signal end and the first node, and configured to control a potential at the first node in accordance with an input driving signal from the input driving signal end;

the second control circuit is electrically coupled to a control clock signal end, a first voltage end and the first node, and configured to control the first node to be electrically coupled to the first voltage end under the control of a control clock signal from the control clock signal end;

the first output circuit is electrically coupled to the first node, a first clock signal end and the output driving signal end, and configured to control the output driving signal end to be electrically coupled to the first clock signal end under the control of the potential at the first node; and the second output circuit is electrically coupled to the first clock signal end and the output driving signal end, and configured to control the output driving signal end to provide an output driving signal in accordance with a first clock signal from the first clock signal end.

2. The driving circuit according to claim 1, wherein the first control circuit is further electrically coupled to a second clock signal end, and specifically configured to control the input driving signal end to be electrically coupled to the first node under the control of a second clock signal from the second clock signal end.

3. The driving circuit according to claim 2, wherein the first control circuit comprises a first transistor, a control electrode of the first transistor is electrically coupled to the second clock signal end, a first electrode of the first transistor is electrically coupled to the input driving signal end, and a second electrode of the first transistor is electrically coupled to the first node.

4. The driving circuit according to claim 2, wherein the second control circuit comprises a second transistor, a control electrode of the second transistor is electrically coupled to the control clock signal end, a first electrode of the second transistor is electrically coupled to the first voltage end, and a second electrode of the second transistor is electrically coupled to the first node.

5. The driving circuit according to claim 2, wherein the energy storage circuit comprises a storage capacitor, the first output circuit comprises a first output transistor, a first end of the storage capacitor is electrically coupled to the first node, a second end of the storage capacitor is electrically coupled to the output driving signal end, a control electrode of the first output transistor is electrically coupled to the first node, a first electrode of the first output transistor is electrically coupled to the output driving signal end, and a second electrode of the first output transistor is electrically coupled to the first clock signal end.

6. A driving method for the driving circuit according to claim 1, a driving cycle comprising a first stage, a second stage and a third stage arranged sequentially, the driving method comprising:

at a first stage, controlling, by the first control circuit, a potential at the first node in accordance with the input driving signal from the input driving signal end, and controlling, by the first output circuit, the output driving signal end to be electrically coupled to the first clock signal end under the control of the potential at the first node;

at a second stage, changing, by the energy storage circuit, the potential at the first node, and controlling, by the first output circuit, the output driving signal end to be electrically coupled to the first clock signal end continuously under the control of the potential at the first node; and at a third stage, controlling, by the second control circuit, the first node to be electrically coupled to the first voltage end under the control of the control clock signal, and controlling, by the first output circuit, the output driving signal end to be electrically decoupled from the first clock signal end under the potential at the first node.

7. The driving method according to claim 6, wherein the driving cycle further comprises a fourth stage after the third stage, and the driving method further comprises:

within at least a part of time periods at the fourth stage, controlling, by the second output circuit, the output driving signal from the output driving signal end to be an inactive voltage signal in accordance with the first clock signal.

8. The driving method according to claim 6, wherein the driving circuit further comprises a third output circuit, and the driving method further comprises:

at the first stage, controlling, by the third output circuit, the output driving signal end to be electrically coupled to the first voltage end under the control of the input driving signal.

9. The driving method according to claim 6, wherein $\Delta t1$ is greater than a sum of a fall time $t1$ of the first clock signal, a fall time $t01$ of the control clock signal and a first time interval $m1$, and $\Delta t1$ is smaller than $w1-t2-t02-m2$, wherein $\Delta t1$ is a time difference between a falling edge of the first clock signal and a falling edge of the control clock signal, $w1$ is a time for which a potential of the first clock signal is maintained as a low voltage, $t2$ is a rise time of the first clock signal, $t02$ is a rise time of the control clock signal, and $m2$ is a second time interval.

10. The driving circuit according to claim 1, wherein the second output circuit is further electrically coupled to a second voltage end, and configured to control the output driving signal end to be electrically coupled to the second voltage end under the control of the first clock signal.

11. The driving circuit according to claim 10, wherein the second control circuit comprises a second transistor, a control electrode of the second transistor is electrically coupled to the control clock signal end, a first electrode of the second transistor is electrically coupled to the first voltage end, and a second electrode of the second transistor is electrically coupled to the first node.

12. The driving circuit according to claim 10, wherein the energy storage circuit comprises a storage capacitor, the first output circuit comprises a first output transistor, a first end of the storage capacitor is electrically coupled to the first node, a second end of the storage capacitor is electrically coupled to the output driving signal end, a control electrode of the first output transistor is electrically coupled to the first node, a first electrode of the first output transistor is electrically coupled to the output driving signal end, and a second electrode of the first output transistor is electrically coupled to the first clock signal end.

13. The driving circuit according to claim 1, further comprising a third output circuit electrically coupled to the input driving signal end, the first voltage end and the output driving signal end, and configured to control the output driving signal end to be electrically coupled to the first voltage end under the control of the input driving signal.

14. The driving circuit according to claim 13, wherein the third output circuit comprises a third output transistor, a control electrode of the third output transistor is electrically coupled to the input driving signal end, a first electrode of the third output transistor is electrically coupled to the first voltage end, and a second electrode of the third output transistor is electrically coupled to the output driving signal end.

15. The driving circuit according to claim 1, wherein the first control circuit comprises a first transistor, a control electrode and a first electrode of the first transistor are electrically coupled to the input driving signal end, and a second electrode of the first transistor is electrically coupled to the first node.

16. The driving circuit according to claim 1, wherein the second control circuit comprises a second transistor, a control electrode of the second transistor is electrically coupled to the control clock signal end, a first electrode of the second transistor is electrically coupled to the first voltage end, and a second electrode of the second transistor is electrically coupled to the first node.

17. The driving circuit according to claim 1, wherein the energy storage circuit comprises a storage capacitor, the first output circuit comprises a first output transistor, a first end of the storage capacitor is electrically coupled to the first node, a second end of the storage capacitor is electrically coupled to the output driving signal end, a control electrode of the first output transistor is electrically coupled to the first node, a first electrode of the first output transistor is electrically coupled to the output driving signal end, and a second electrode of the first output transistor is electrically coupled to the first clock signal end.

18. The driving circuit according to claim 1, wherein the second output circuit comprises a second output transistor, a control electrode and a first electrode of the second output transistor are electrically coupled to the first clock signal end, and a second electrode of the second output transistor is electrically coupled to the output driving signal end.

19. The driving circuit according to claim 1, wherein, the second output circuit comprises a second output transistor, a control electrode of the second output transistor is electrically coupled to the first clock signal end, a first electrode of the second output transistor is electrically coupled to the second voltage end, and a second electrode of the second output transistor is electrically coupled to the output driving signal end.

20. A display device, comprising the driving circuit according to claim 1.

* * * * *